United States Patent [19]

Kurokawa

[11] Patent Number: 5,513,053

[45] Date of Patent: Apr. 30, 1996

[54] COMBINATION CASING MEMBER, CAM MEMBER AND CASSETTE HOLDER FOR A CASSETTE LOADING MECHANISM

[75] Inventor: Toshiya Kurokawa, Chiba, Japan

[73] Assignee: Sony Corporation, Tokyo, Japan

[21] Appl. No.: 325,070

[22] Filed: Oct. 19, 1994

[30] Foreign Application Priority Data

Oct. 22, 1993 [JP] Japan .................. 5-287701

[51] Int. Cl.$^6$ .................................. G11B 33/00
[52] U.S. Cl. .................................. 360/96.5
[58] Field of Search .................. 360/96.5, 96.6, 360/96.1

[56] References Cited

U.S. PATENT DOCUMENTS

| | | | |
|---|---|---|---|
| 4,614,991 | 9/1986 | Murakami | 360/96.6 X |
| 4,639,801 | 1/1987 | Hoppmanns et al. | 360/96.1 X |
| 5,377,061 | 12/1994 | Yoshimura | 360/96.5 |
| 5,396,382 | 3/1995 | Murayama | 360/96.5 |

FOREIGN PATENT DOCUMENTS

| | | | |
|---|---|---|---|
| 5-166270 | 7/1993 | Japan | 360/96.5 |
| 6-111437 | 4/1994 | Japan | 360/96.5 |

*Primary Examiner*—John H. Wolff
*Attorney, Agent, or Firm*—William S. Frommer; Alvin Sinderbrand

[57] ABSTRACT

A cassette loading apparatus comprises a casing member, a cam member, and a cassette holder. The casing member has side walls, one of which has two guide grooves. The cam member is supported to one of the side walls of the casing member and comprises two guide grooves. The cassette holder holds the cassette and comprises a first engaging member to engage the first guide groove of the side wall through one of the guide grooves of the cam member; and a second engaging member to engage the second guide groove of the side wall through the other guide groove of the cam member. When the second engaging member is located in the lead-in portion of the second guide groove, the cassette holder is upwardly inclined.

7 Claims, 15 Drawing Sheets

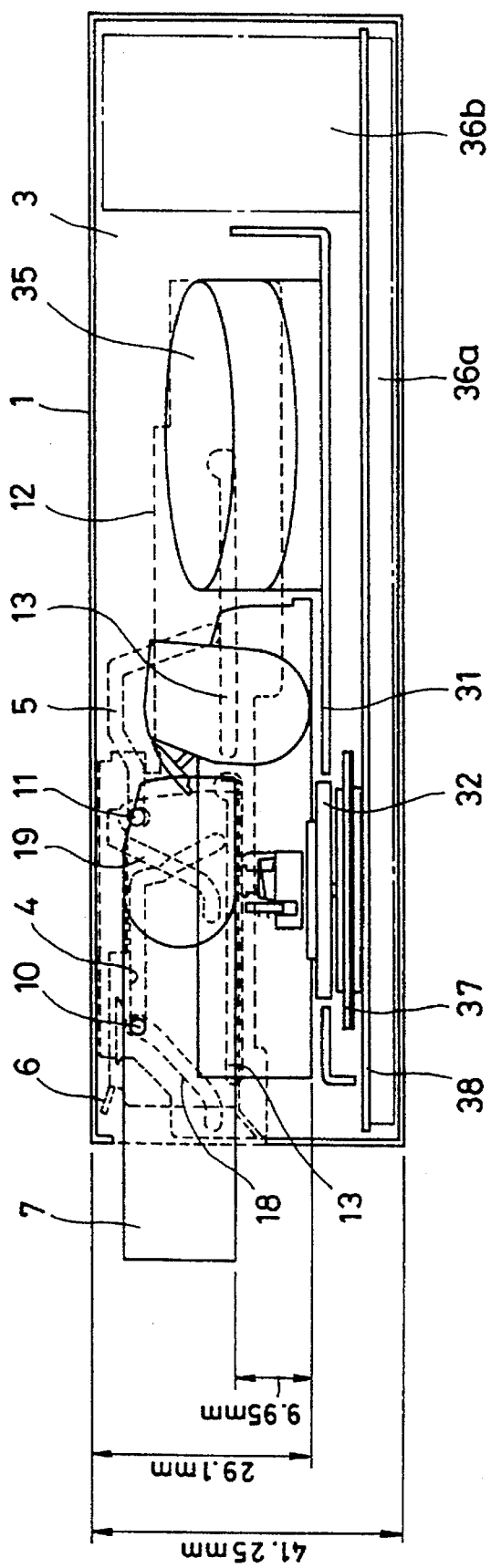

COMBINATION CASING MEMBER, CAM MEMBER AND CASSETTE HOLDER FOR A CASSETTE LOADING MECHANISM

BACKGROUND OF THE INVENTION

1. Field of the Invention

The invention relates to a cassette loading mechanism for loading a cassette and, more particularly, to a cassette loading mechanism of a front loading system.

2. Description of the Prior Art

Hitherto, a front loading system has been known as one of cassette loading mechanisms of a recording and reproducing apparatus using a tape-shaped recording medium. As one of the standards using the tape-shaped recording medium, there is what is called an 8 mm standard using a magnetic tape having a width of 8 mm. As disclosed in U.S. Pat. No. 4,631,618 or the like, the magnetic tape of the 8 mm standard is enclosed in a tape cassette. To protect the magnetic tape, a lid body comprising a front lid and a back lid for covering the magnetic tape from the upper and lower directions when the tape cassette is not used is provided for the tape cassette.

A case of applying the cassette loading mechanism of the front loading system to the tape cassette of the 8 mm standard will now be considered.

Generally, in the cassette loading mechanism of the front loading system, a tape cassette is loaded into a cassette holder, the cassette holder is first moved in the horizontal direction, and the cassette holder is subsequently moved downward, thereby loading the cassette holder. Both of the front lid and the back lid have to be opened for a period of time until the end of the loading. Further, the back lid is moved fairly upward for the cassette main body from a state in which the opening of the back lid is started. Therefore, the upper surface of a casing of the recording and reproducing apparatus cannot help being set to an upper position than the highest point in the moving loci of the front lid and back lid. In other words, a height of recording and reproducing apparatus cannot be suppressed to a low height.

As one of the methods of solving the above drawback, a method disclosed in JP-A-4-14661 has already been proposed. According to the loading mechanism disclosed in JP-A-4-14661, the rear side in the inserting direction of a tape cassette is set to a state in which it is lower than the front side, a tape cassette is inserted toward the rear side of the recording and reproducing apparatus, and the tape cassette is subsequently descended downward, thereby finishing the loading. To realize such an operation, the above loading mechanism needs: a loading arm for depressing downward a pin on the rear side in the inserting direction between a pair of pins provided in the front and rear directions of a cassette holder so as to be away from each other; a slider for preventing that the pin on the front side of the cassette holder drops downward; and a gear train for coupling an output axis of a motor and the loading arm in order to drive the loading arm. There are, consequently, problems such that the structure is complicated and the dimension in the width direction increases.

The recording and reproducing apparatus using a tape-shaped recording medium (hereinafter, such an apparatus is referred to as a cassette tape recorder) is also used not only for a video signal and audio signals but also as a data streamer as an auxiliary memory device or the like of a computer.

A disk drive apparatus is well known as a data streamer. Disks having sizes of 5 inches and 3.5 inches are used. To make the assembling operation into the computer easy, such a disk drive apparatus generally has standard external dimensions. For example, the standard size of a thin disk drive apparatus of 5.25 inches called a half height has dimensions such that a width (W) is equal to 146 mm and a height (H) is equal to 41.25 mm. The standard size of a disk drive apparatus of 3.5 inches called a standard height has dimensions such that a width (W) is equal to 101.6 mm and a height (H) is equal to 41.25 mm and a depth (D) is equal to 150 mm.

Therefore, when the cassette tape recorder is used as a data streamer, it is desirable to have the same size as the external shape of the existing disk drive apparatus. In case of constructing the cassette tape recorder as a drive apparatus, the drive apparatus has a construction such that a cassette loading mechanism, a tape loading mechanism to wrap a tape around a tape guide drum, a reel base plate drive motor, and the like are enclosed in a common casing. It is desirable that the size of casing is the same as the size of the existing disk drive apparatus.

As for a data streamer, it is preferable to use the front loading system as a tape loading mechanism from a viewpoint of the limitation of the size mentioned above when using the cassette tape recorder. However, even with respect to the cassette loading mechanism of the front loading system, complicated operations such that the cassette inserted from the front side is led into the rear side and is further moved downward and is loaded at a predetermined cassette loading position have to be executed. A mechanism for such a purpose is complicated. It is, consequently, difficult to construct a data streamer of the same size as the standard size of the disk drive apparatus of 3.5 inches with regard to the width and height.

Specifically speaking, when considering a case of using the cassette of a tape width of 8 mm as a data streamer, the standard of the lateral width of the cassette is equal to 95±0.2 mm (maximum, 95.2 mm). On the other hand, the lateral width of the existing disk drive apparatus of 3.5 inches is equal to 101.6 mm. Therefore, with respect to the lateral width, there is only an allowance of 6.4 mm (3.2 mm on one side).

Since a standard height of the above-mentioned disk drive apparatus is equal to 41.25 mm, when considering of a height of reel driving section, it is necessary to set a length from the upper surface of the casing to the lower surface when the cassette is loaded to a value of 35 mm or less.

In consideration of a thickness (for instance, 0.5 mm) of the casing and a thickness (for example, 0.8 mm) of the cassette holder, with respect to the lateral width, it is necessary to construct the cassette loading mechanism so as to have a width of 1.9 mm or less. As for the height, when also considering a mounting space of an electric board, it is necessary to construct the cassette loading mechanism so as to have a height of, for example, 29.1 mm or less.

OBJECTS AND SUMMARY OF THE INVENTION

It is an object of the invention to provide a cassette loading mechanism which can solve the foregoing problems.

More specific object of the invention is to provide a cassette loading mechanism of the front loading system in which a height can be suppressed to a low value and a mechanism is simple and a dimension in the lateral direction is also small.

According to the present invention, the above objects are accomplished by a cassette loading apparatus for loading a cassette at a position between an inserting position and a loading position, comprising:

a casing member having first and second side walls, in which at least one of the side walls has a first guide groove and a second guide groove, the first guide groove has a horizontal portion extending in a first direction which coincides with an inserting direction of the cassette, an initial descending portion which is continuously formed from one end on the rear side in the inserting direction of the horizontal portion and extends in the vertical direction, and a descending inclined portion which is continuously formed from a lower edge of the initial descending portion and extends downward as the descending inclined portion is deformed toward the rear side, and the second guide groove which is formed on the rear side than the first guide groove and has a lead-in portion extending in the first direction and a descending inclined portion which is continuously formed from one end on the rear side of the lead-in portion and is deformed in the lower direction as the descending inclined portion approaches the rear side;

a cam member which is supported to one of the side walls of the casing member so as to be movable in the first direction and has a third guide groove having a first inclined portion formed so as to be deformed upward as the first inclined portion approaches the rear side along the first direction and a fourth guide groove which is formed on the rear side than the third guide groove and has a second inclined portion formed so as to be deformed upward as the second inclined portion approaches the rear side along the first direction and an engaging portion formed so as to extend almost downward from an upper end of the second inclined portion; and a cassette holder which can hold the cassette and has a first engaging member which is come into engagement with the first guide groove of the side wall through the third guide groove of the cam member and a second engaging member which is come into engagement with the second guide groove of the side wall through the fourth guide groove of the cam member, wherein the cassette holder is set to an inclined state in which the rear side in the first direction is directed upward than the front side when the second engaging member is located to the lead-in portion of the second guide groove, and when the first engaging member of the cassette holder is located at a cross point by the edge portion on the rear side of the horizontal portion of the first guide groove and the upper edge portion of the third guide groove, the second engaging portion is located at a cross point by the edge portion on the rear side of the lead-in portion of the second guide groove and the coupling portion of the upper edge of the second inclined portion of the fourth guide groove and the upper edge of the engaging portion.

The above and other objects and features, operations, and advantages of the present invention will become apparent from the following detailed description and the appended claims with reference to the accompanying drawings.

BRIEF DESCRIPTION OF THE DRAWINGS

FIG. 15 is a schematic side elevational view of a cassette loading mechanism and a construction in the casing.

DETAILED DESCRIPTION OF THE PREFERRED EMBODIMENTS

Figure 1:
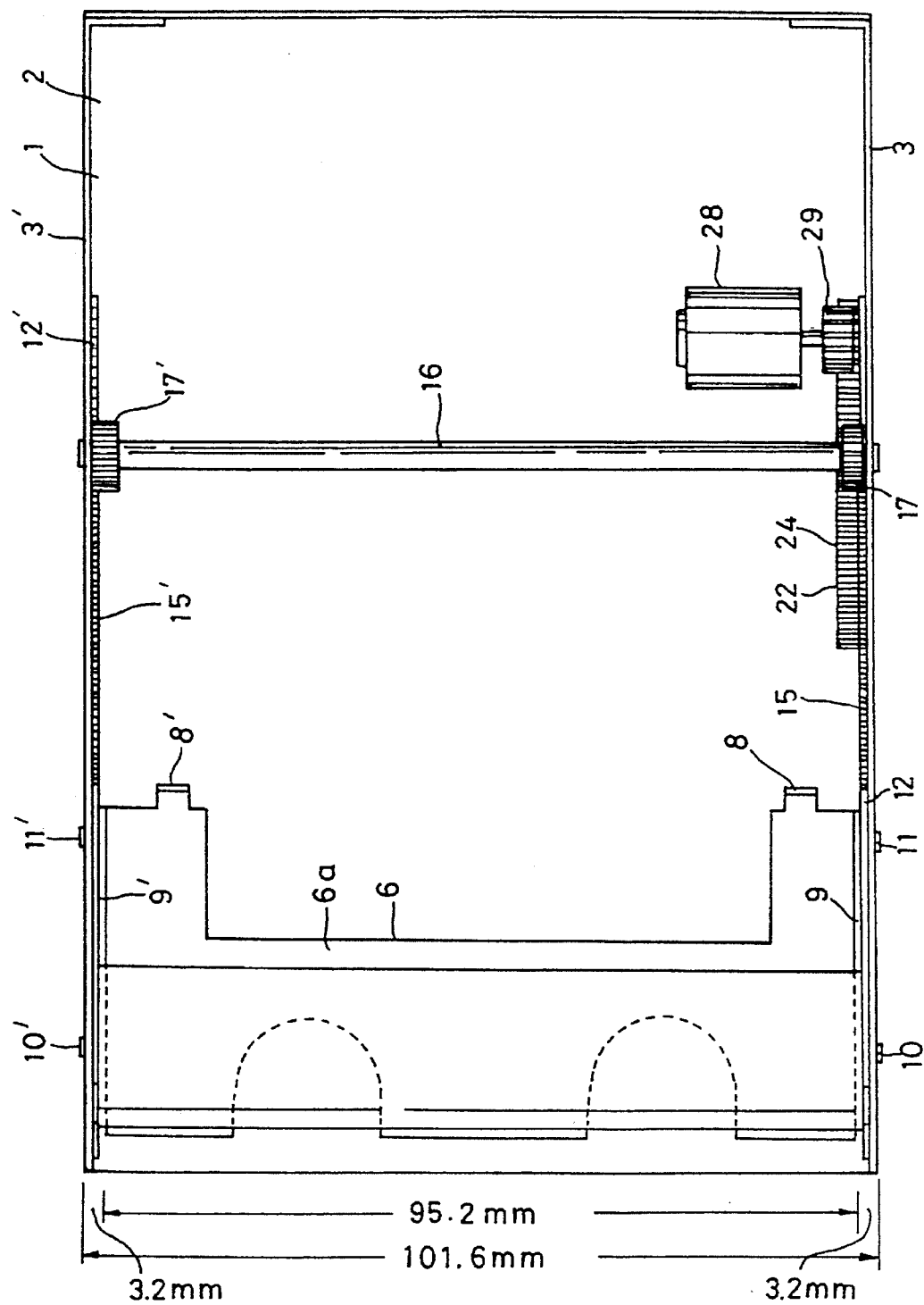
FIG. 1 is a plan view of an embodiment of the present invention.

With respect to an embodiment of the invention, particularly, a cassette loading mechanism will now be described in detail hereinbelow. The embodiment shown in the diagram relates to the cassette loading mechanism of the digital data streamer to which the invention is applied. Reference numeral 1 denotes a casing. A cassette loading mechanism, a tape guide drum, a reel base plate driving section, a tape loading mechanism, and an electric board on which a circuit for performing a part of or all of the controls of them is mounted are enclosed in the casing 1. In FIG. 1, the dimension (101.6 mm) of the lateral width of the casing 1 and the maximum value (95.2 mm) of the lateral width of the cassette are shown. As mentioned above, the dimension of the lateral width of the casing 1 coincides with that of the existing disk drive of 3.5 inches. The casing 1 is fixed to a chassis (not shown), thereby constructing a cassette tape recorder.

Figure 2:
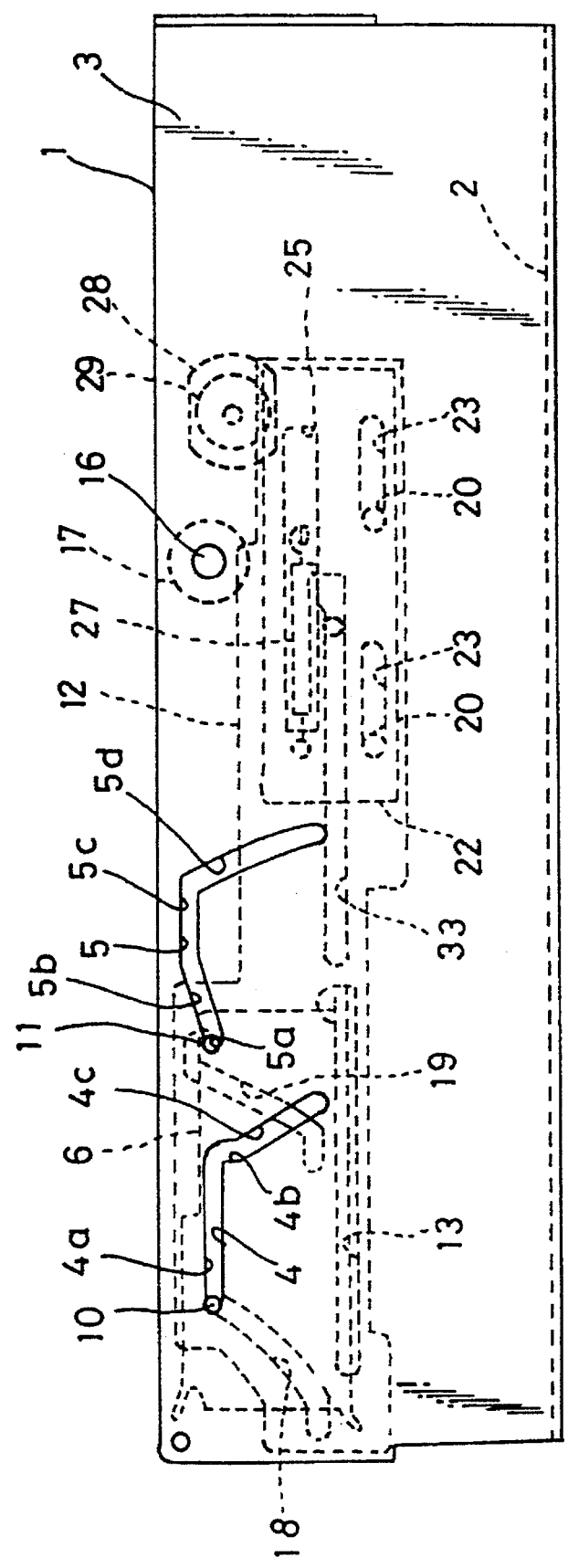
FIG. 2 is a side elevational view of the embodiment of the invention.

Hereinbelow, the direction directing toward the left in FIG. 2 assumes the front direction and the direction directing toward the right assumes the rear direction. The direction directing upward in the diagram assumes the upper direction and the direction directing downward assumes the lower direction. Further, the direction directing toward the front side than the paper surface in the diagram assumes the right direction and the direction directing toward the rear side than the paper surface assumes the left direction. It is now assumed that each direction is shown in accordance with the above definition hereinbelow. In the portions near the front edges of side wall plates 3 and 3', a pair of guide grooves 4 and 4' and a pair of guide grooves 5 and 5' are formed in the upper portions so as to be aligned at the front and back positions, respectively. Each reference numeral with a dash (') denotes a member existing on the left side, while each reference numeral without a dash (') indicates a member existing on the right side. There are also members on the right and left sides which are not shown.

The guide groove 4 comprises: a lead-in portion 4a extending horizontally from the front edge toward the rear side; an initial descending portion 4b formed so as to have a relatively short length and extending vertically from the rear edge of the lead-in portion 4a toward the lower direction; and a descending inclined portion 4c extending from the lower edge of the initial descending portion 4b toward the lower direction while slightly deforming toward the rear direction.

The guide groove 5 comprises: an initial lead-in portion 5a extending horizontally from the front edge toward the rear direction; an ascending inclined portion 5b extending from the rear edge of the initial lead-in portion 5a toward the rear direction so that the rear portion is slightly higher than the front portion; a final lead-in portion 5c extending horizontally from the rear edge of the ascending inclined portion 5b toward the rear direction; and a descending inclined portion 5d extending from the rear edge of the final lead-in portion 5c toward the lower direction while deforming in the rear direction.

A length in the front/rear direction in a range from the front edge to the rear edge of the lead-in portion 4a of the guide groove 4 is almost equal to a length in the front/rear direction in a range from the front edge of the initial lead-in portion 5a of the guide groove 5 to the rear edge of the final lead-in portion 5c. A length in the vertical direction in a range from the upper edge of the initial descending portion 4b of the guide groove 4 to the lower edge of the descending inclined portion 4c is almost equal to a length in the vertical direction in a range from the upper edge of the initial lead-in portion 5a of the guide groove 5 to the lower edge of the descending inclined portion 5d. Therefore, a length in the vertical direction in a range from the upper edge of the initial descending portion 4b of the guide groove 4 to the lower edge of the descending inclined portion 4c is slightly shorter than a length in the vertical direction in a range from the upper edge of the descending inclined portion 5d of the guide groove 5 to the lower edge of the descending inclined portion 5d.

Reference numeral 6 denotes a cassette holder adapted to detachably hold a tape cassette 7 therein. Cassette position deciding members 8 and 8' projecting upward are provided in a rear edge portion of a bottom plate 6a. Two supporting pins 10 and 10' and two supporting pins 11 and 11' are respectively projected outwardly on both of right and left side walls 9 and 9' of the cassette holder 6 so as to be away from each other at the front and rear positions. The supporting pins 10 and 10' on the front side are slidably come into engagement with the guide grooves 4 and 4' on the front side, respectively. The supporting pins 11 and 11' on the rear side are slidably come into engagement with the guide grooves 5 and 5' on the rear side, respectively. A member (not shown) for cancelling a locking member to lock the opening or closing state of each of the upper and lower lids of the tape cassette 7 is also provided for the cassette holder 6.

Reference numerals 12 and 12' denote cam plates which are located between the side walls 3 and 3' of the casing 1 and the cassette holder 6 and are supported to the side walls 3 and 3' so as to be movable in the front/rear direction. Each of the cam plates 12 and 12' has an almost plate-like shape extending in the front/rear direction and has a length in the front/rear direction of almost ⅘ of the length in the front/rear direction of each of the side walls 3 and 3'. A width in the vertical direction of each of the cam plates 12 and 12' is almost the half of the width in the vertical direction of each of the side walls 3 and 3'. Two long guide grooves 13 and 13' and two long guide grooves 33 and 33' are formed in the front/rear direction at the positions near the lower edges of the cam plates 12 and 12' so as to be away from each other in the front/rear direction, respectively. Supporting pins 14 and 14' projected on the inside surfaces of the side walls 3 and 3' are slidably come into engagement with the guide grooves 13 and 13', respectively. Supporting pins 34 and 34' projected on the inside surfaces of the side walls 3 and 3' are slidably come into engagement with the guide grooves 33 and 33', respectively. Thus, the cam plates 12 and 12' are supported to the side walls 3 and 3' of the casing 1 so as to be movable in the front/rear direction, respectively.

Figure 3:
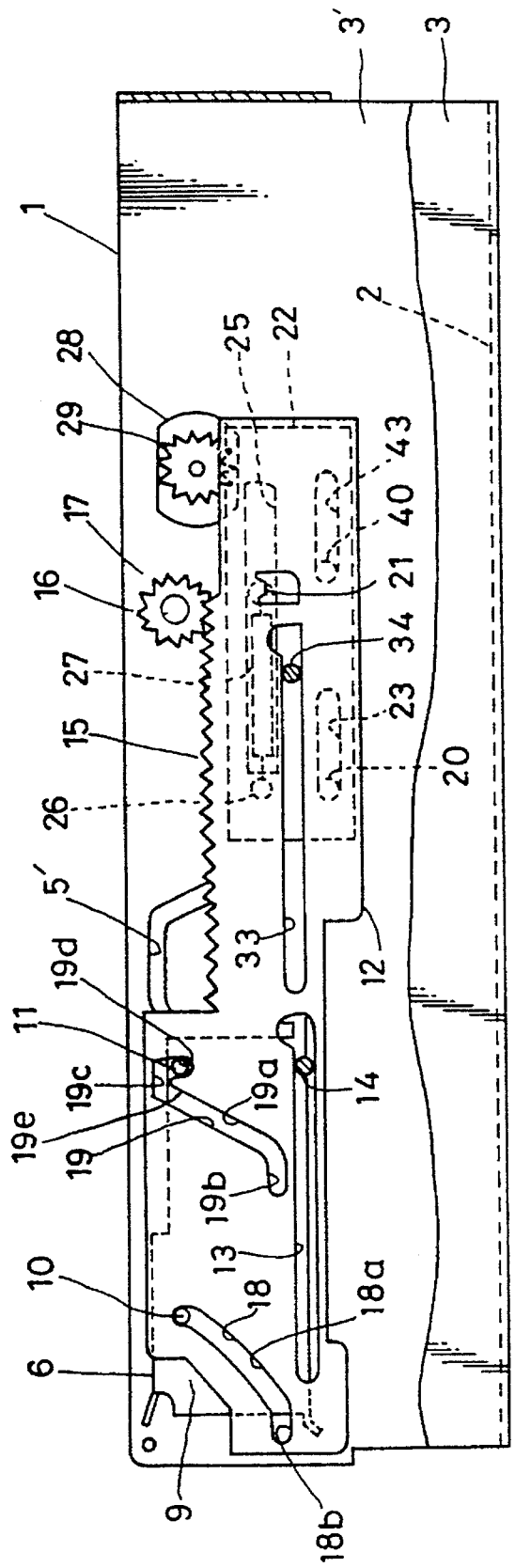
FIG. 3 is a right side elevational view showing the embodiment of the invention with a side wall on the right side cut away.
Figure 4:
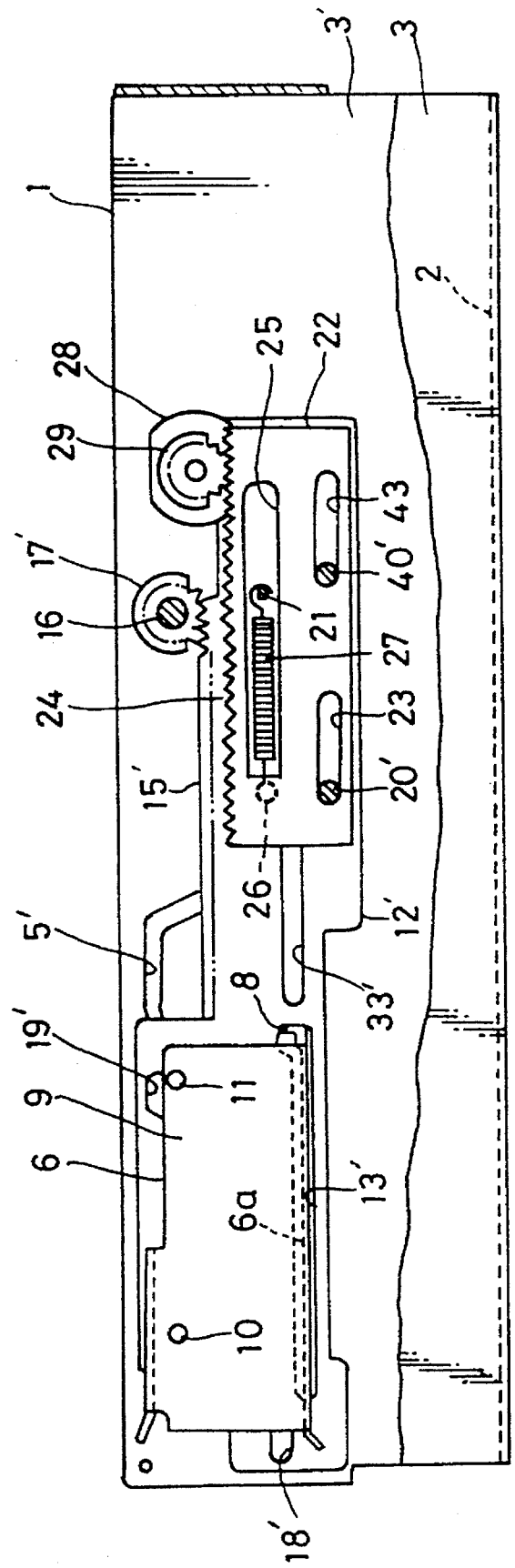
FIG. 4 is a right side elevational view showing the embodiment with a cam plate on the right side cut away from a state of FIG. 3.

As shown in FIG. 3, the upper portions of the rear side portions of the cam plates 12 and 12' are cut away. Racks 15 and 15' are formed at the upper edges of the portions excluding almost ⅓ of the portions near the rear edges of the cut portions, respectively.

Reference numeral 16 denotes an axis which is rotatably supported at a position that is slightly deviated on the rear side than the centers of the portions near the upper edges of the side walls 3 and 3' of the casing 1. Gears 17 and 17' are fixed at the positions of the axis 16 which are in contact with the inner surfaces of the side walls 3 and 3'. The gear 17 is in engagement with the rack 15 of the cam plate 12. The gear 17' is in engagement with the rack 15' of the cam plate 12'. Consequently, the two cam plates 12 and 12' can be synchronously moved in the front/rear direction.

Two cam grooves 18 and 18' and two cam grooves 19 and 19' are formed in the former half portions of the cam plates 12 and 12' so as to be away from each other in the front/rear direction, respectively. The cam grooves 18 and 18' comprise: inclined portions 18a and 18a' which are inclined so as to be deformed in the front direction as they approach the lower direction; and loading portions 18b and 18b' extending horizontally from the lower edges of the inclined portions 18a and 18a' toward the front direction, respectively.

The cam grooves 19 and 19' comprise inclined portions 19a and 19a' and loading portions 19b and 19b', respectively. The upper edges of the inclined portions 19a and 19a' are located at positions higher than the upper edges of the inclined portions 18a and 18a'. Horizontal portions 19c and 19c' extending horizontally from the upper edges of the inclined portions 19a and 19a' toward the rear direction are formed. Engaging portions 19d and 19d' extending almost vertically from the rear edges of the horizontal portions 19c and 19c' toward the lower direction are formed. Projecting portions 19e and 19e' are formed in the lower portions of the horizontal portions 19c and 19c', respectively.

The supporting pins 10 and 10' of the cassette holder 6 are slidably come into engagement with the cam grooves 18 and 18' of the cam plates 12 and 12', respectively. The supporting pins 11 and 11' are slidably come into engagement with the cam grooves 19 and 19', respectively. Reference numerals 20 and 40 denote supporting pins projected on the surfaces near the lower edge of the latter half portion of the cam plate 12 on the right side so as to be away from each other, respectively. Reference numeral 21 denotes a spring hooking portion provided at a position which is slightly close to the rear position than the center of the latter half portion of the cam plate 12 on the right side.

Reference numeral 22 denotes a rack plate having a rectangular shape which is long in the front/rear direction. Supporting holes 23 and 43 which are long in the front/rear direction are formed at positions near the lower edge of the rack plate 22 so as to be away from each other in the front/rear direction, respectively. The supporting pins 20 and 40 of the cam plate 12 on the right side are slidably come into engagement with the supporting holes 23 and 43, respectively. The rack plate 22 is, consequently, supported to the cam plate 12 on the right side so as to be movable in the front/rear direction.

A rack 24 is formed at the upper edge of the rack plate 22. A long hole 25 extending in the front/rear direction is formed at a position near the upper edge of the rack plate 22. A spring hooking pin 26 is projected at a position which is slightly close to the front side than the front edge of the long hole 25. In a state in which the rack plate 22 is movably supported to the cam plate 12, the spring hooking portion 21 of the cam plate 12 is located in the long hole 25 of the rack plate 22.

Reference numeral 27 denotes a coil spring. The front edge portion of the coil spring 27 is hooked to the spring hooking pin 26 of the rack plate 22 and the rear edge portion is hooked to the spring hooking portion 21 of the cam plate 12. When a force to extend the coil spring 27 is not applied, the supporting pins 20 and 40 of the cam plate 12 are respectively come into contact with the front edges of the supporting holes 23 and 43 of the rack plate 22 by a tension of the coil spring 27, respectively.

Reference numeral 28 denotes a motor fixed to a position near the rear edge of the side wall 3 on the right side of the casing 1. A pinion 29 is fixed to an output axis of the motor 28. The pinion 29 is come into engagement with the rack 24 of the rack plate 22.

Figure 5:
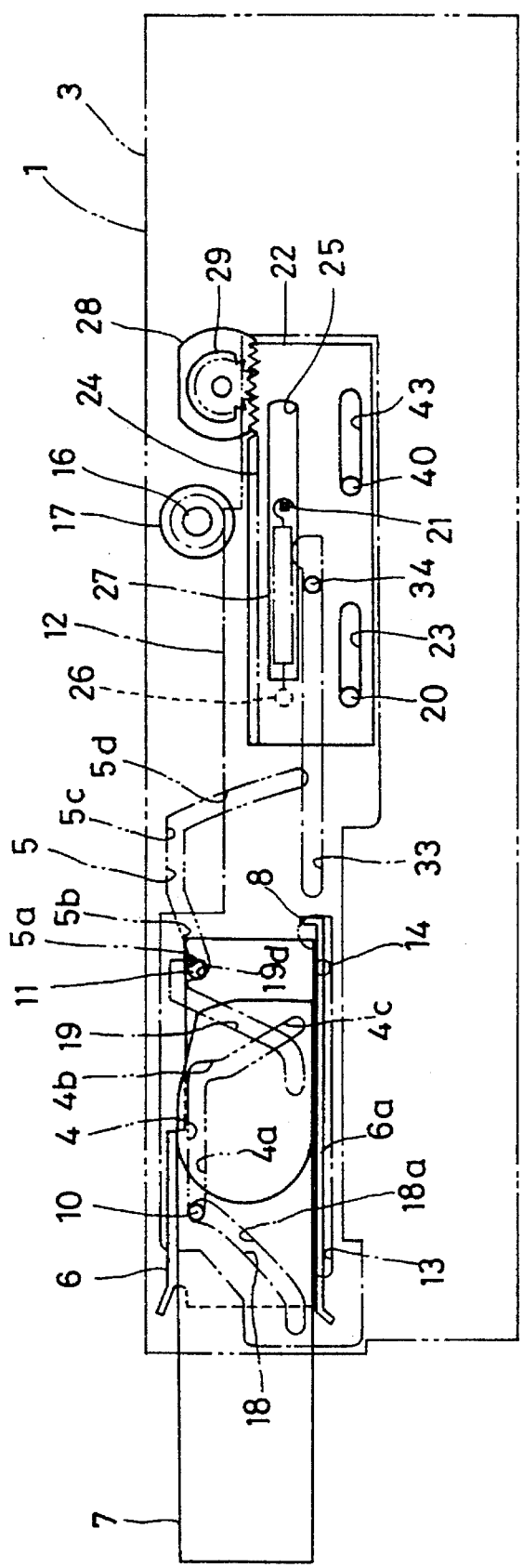
FIG. 5 is a schematic side elevational view showing an initial state of the operation according to the embodiment of the invention.

The operation of the cassette loading mechanism having the above construction will now be described with reference to FIGS. 5 to 13. First, in an initial state, namely, in a state in which no cassette is loaded, a state shown in FIG. 5 is obtained. That is, the cassette holder 6 is located at the frontmost edge in its moving range. The diagrams after FIG. 6 show states of each section which are changed as the cassette 7 is pushed into the mechanism from the initial state.

In the initial state of FIG. 5, the upper edge portions of the inclined portions 18a and 18a' of the cam grooves 18 and 18' of the cam plates 12 and 12' coincide with the front edge portions of the initial lead-in portions 4a and 4a' of the guide grooves 4 and 4' of the casing 1, respectively. The supporting pins 10 and 10' of the cassette holder 6 are located at such coincident portions, respectively. The lower edge portions of the engaging portions 19d and 19d' of the cam grooves 19 and 19' coincide with the front edge portions of the initial lead-in portions 5a and 5a' of the guide grooves 5 and 5', respectively. The supporting pins 11 and 11' of the cassette holder 6 are respectively located at such coincident portions.

In the initial state, the gears 17 and 17' of the axis 16 respectively come into engagement with the rear edge portions of the racks 15 and 15' of the cam plates 12 and 12'. The pinion 29 comes into engagement with the rear edge portion of the rack 24 of the rack plate 22.

Figure 6:
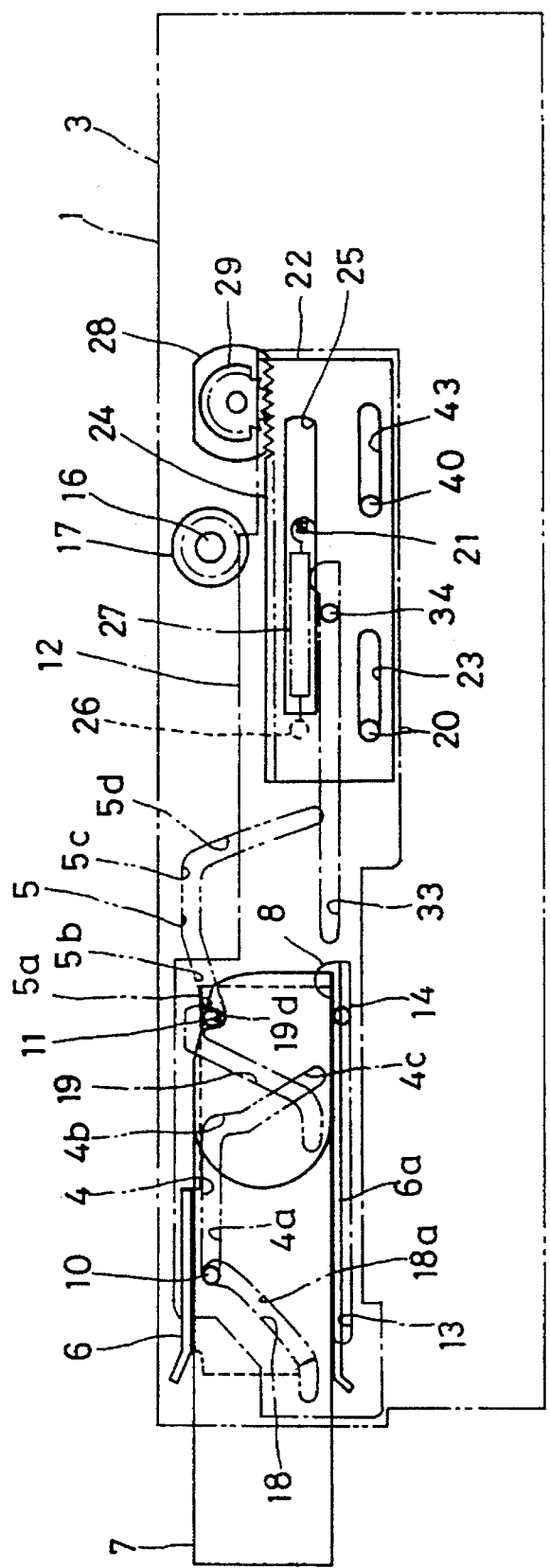
FIG. 6 is a schematic side elevational view showing an operating state subsequent to a state of FIG. 5.
Figure 7:
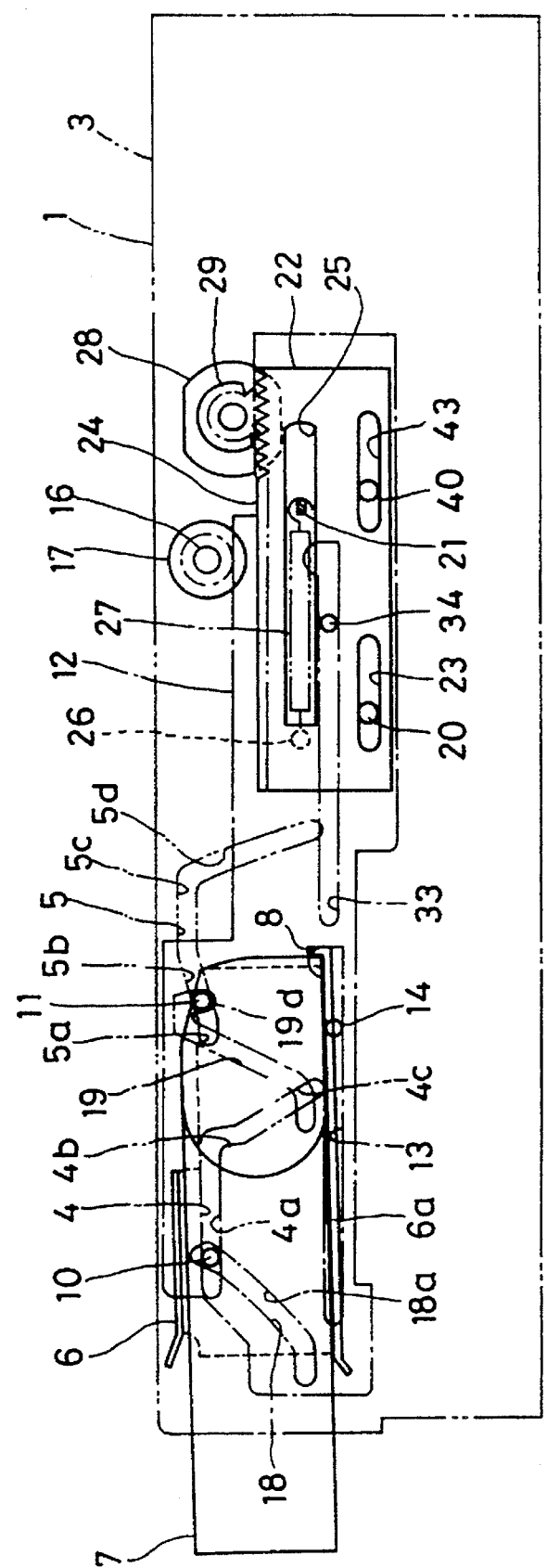
FIG. 7 is a schematic side elevational view showing an operating state subsequent to a state of FIG. 6.
Figure 8:
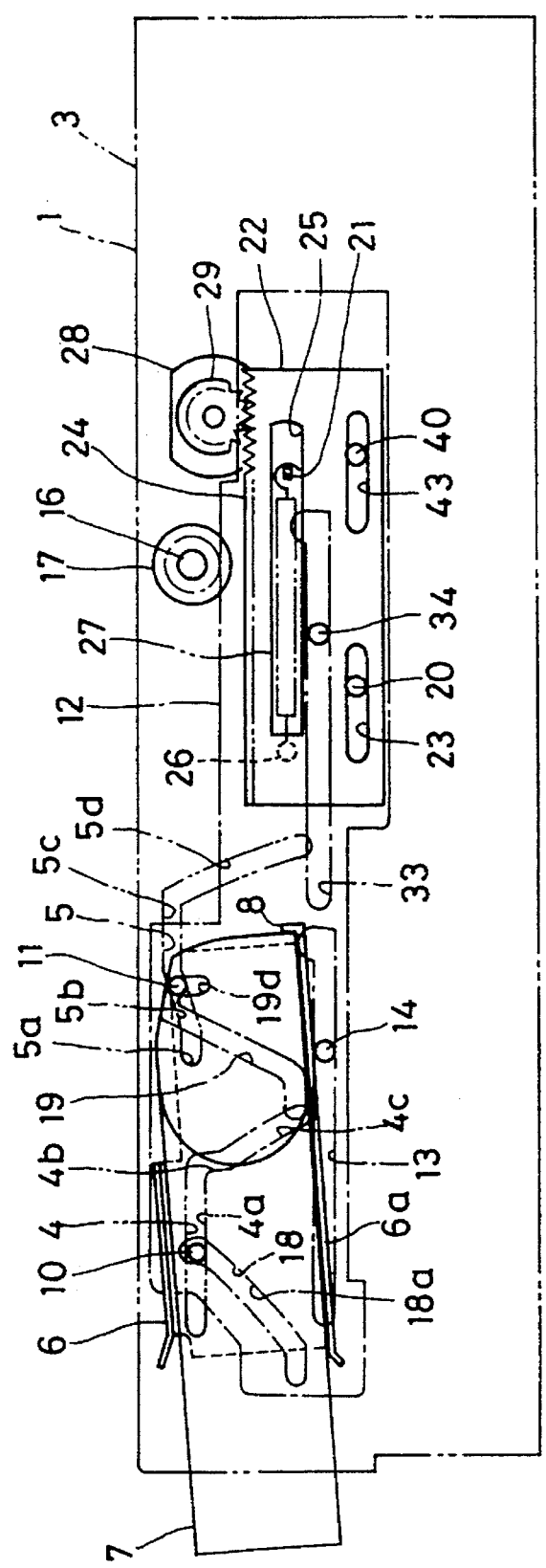
FIG. 8 is a schematic side elevational view showing an operating state subsequent to a state of FIG. 7.
Figure 9:
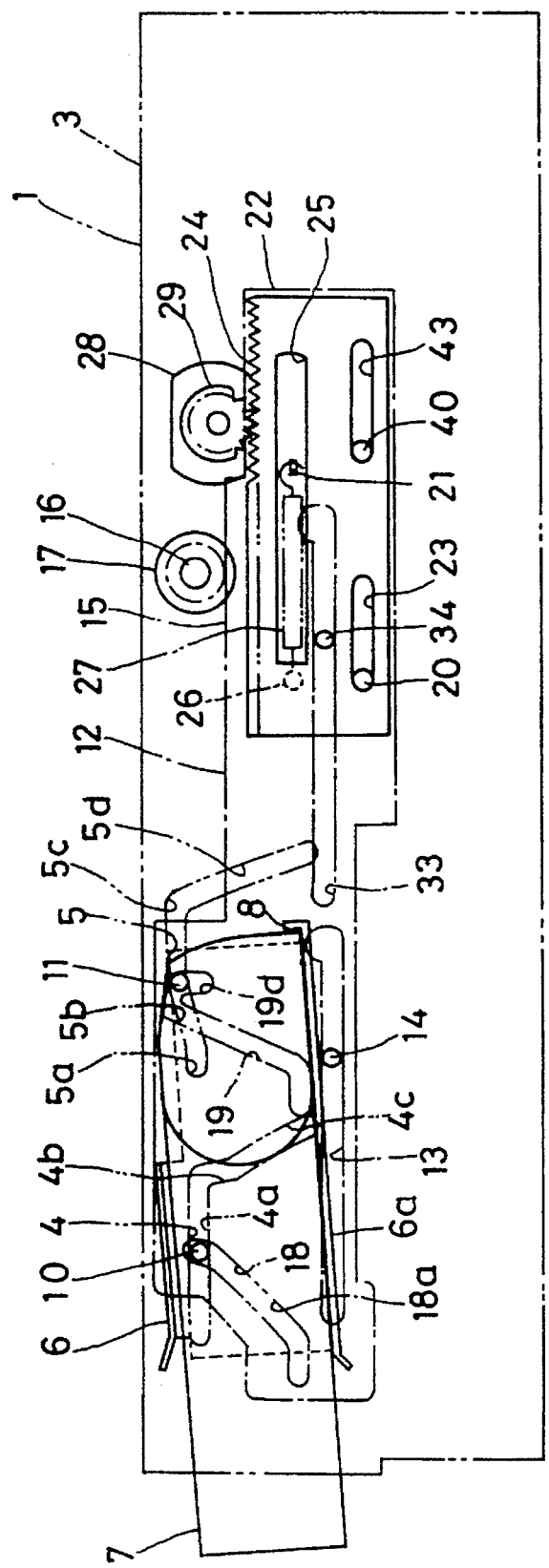
FIG. 9 is a schematic side elevational view showing an operating state subsequent to a state of FIG. 8.

In the initial state, when the tape cassette 7 is inserted from the front side into the cassette holder 6, the front edge of the cassette casing comes into contact with the cassette position deciding members 8 and 8' of the cassette holder 6 (refer to FIG. 6). When the tape cassette 7 is further pushed from such a position, the supporting pins 10 and 10' of the cassette holder 6 press the upper edges of the inclined portions 18a and 18a' of the cam grooves 18 and 18' of the cam plates 12 and 12' in the rear direction. The supporting pins 11 and 11' press the engaging portions 19d and 19d' of the cam grooves 19 and 19' in the rear direction. The cam plates 12 and 12' are, consequently, moved in the rear direction while extending the coil spring 27. The supporting pins 10 and 10' of the cassette holder 6 move the lead-in portions 4a and 4a' of the guide grooves 4 and 4' in the rear direction. The supporting pins 11 and 11' move the initial lead-in portions 5a and 5a' of the guide grooves 5 and 5' in the rear direction. In association with it, the cassette holder 6 is moved in the rear direction.

The motor 28 is not rotated until a predetermined rotational force or more is applied to its output axis when a power source is off. Since the power source of the motor 28 is off in this instance, the output axis of the motor 28 is not rotated so long as the tape cassette 7 is not suddenly inserted. Therefore, the rack plate 22 which is in engagement with the output axis of the motor 28 is not moved in the front/rear direction.

Even when the tape cassette 7 is suddenly inserted as well, since the coil spring 27 functions so as to temporarily store the force generated by the insertion of the tape cassette 7, it is prevented that the rotational force is suddenly applied to the output axis or the like of the motor 28. Consequently, a breakage of the gear when the tape cassette 7 is suddenly inserted is prevented.

Although not shown, a photointerrupter is attached to the side wall 3 and a shielding member for shielding the photointerrupter when it is moved to a predetermined position in the rear direction is provided for the cam plate 12. As will be explained hereinlater, it is desirable to set the predetermined position to a position before the cassette holder 6 is set to a position such that the rear portion is largely lower than the front portion, namely, between a range until the supporting pins 10 and 10' are located from the front edge of the horizontal portion 4a to the rear edge of the horizontal portion 4a. That is, this is because when the supporting pins 10 and 10' are moved to the initial descending portion 4b, the tape cassette 7 which is held in the cassette holder 6 is also set to a position such that the rear side is largely lower than the front side, so that it is difficult to insert the tape cassette by the hand.

In consideration of a point of easiness of the insertion of the tape cassette 7, it is preferable to turn on the motor 28 for a period of time during which the cassette holder 6 maintains the horizontal state, namely, the supporting pins 11 and 11' are located in the initial lead-in portions 5a and 5a', respectively.

When the cam plates 12 and 12' are moved to a predetermined positions in the rear direction, the shielding member shields the photointerrupter, so that a detection signal is generated from the photointerrupter. Thus, the motor 28 is driven in response to the detection signal. The pinion 29 coupled with the motor axis of the motor 28 feeds the rack 24 of the rack plate 22 in the rear direction. The rack plate 22 is, therefore, moved toward the rear direction. The front edges of the supporting holes 23 and 43 of the rack plate 22 are respectively come into contact with the supporting pins 20 and 40 of the cam plate 12, so that the front edges of the supporting holes 23 and 43 pull the supporting pins 20 and 40 in the rear direction, respectively. The cam plates 12 and 12' are, thus, moved in the rear direction. The cam plates 12 and 12' are moved toward the rear direction until the completion of the loading of the tape cassette 7 as mentioned above.

Since the engaging portions 19d and 19d' of the cam grooves 19 and 19' of the cam plates 12 and 12' which move in the rear direction pull the supporting pins 11 and 11' of the cassette holder 6 toward the rear direction, the cassette holder 6 moves in the rear direction.

For such a period of time, the supporting pins 10 and 10' of the cassette holder 6 horizontally move the lead-in portions 4a and 4a' of the guide grooves 4 and 4' in the rear direction. The supporting pins 11 and 11' move the ascending inclined portions 5b and 5b' and final lead-in portions 5c and 5c' in the rear direction in accordance with this order subsequently to the initial lead-in portions 5a and 5a' of the guide grooves 5 and 5'.

Since the supporting pins 10 and 10' of the cassette holder 6 are moved upward by the ascending inclined portions 5b and 5b', the cassette holder 6 is set to a position such that the rear side is lower than the front side.

Figure 10:
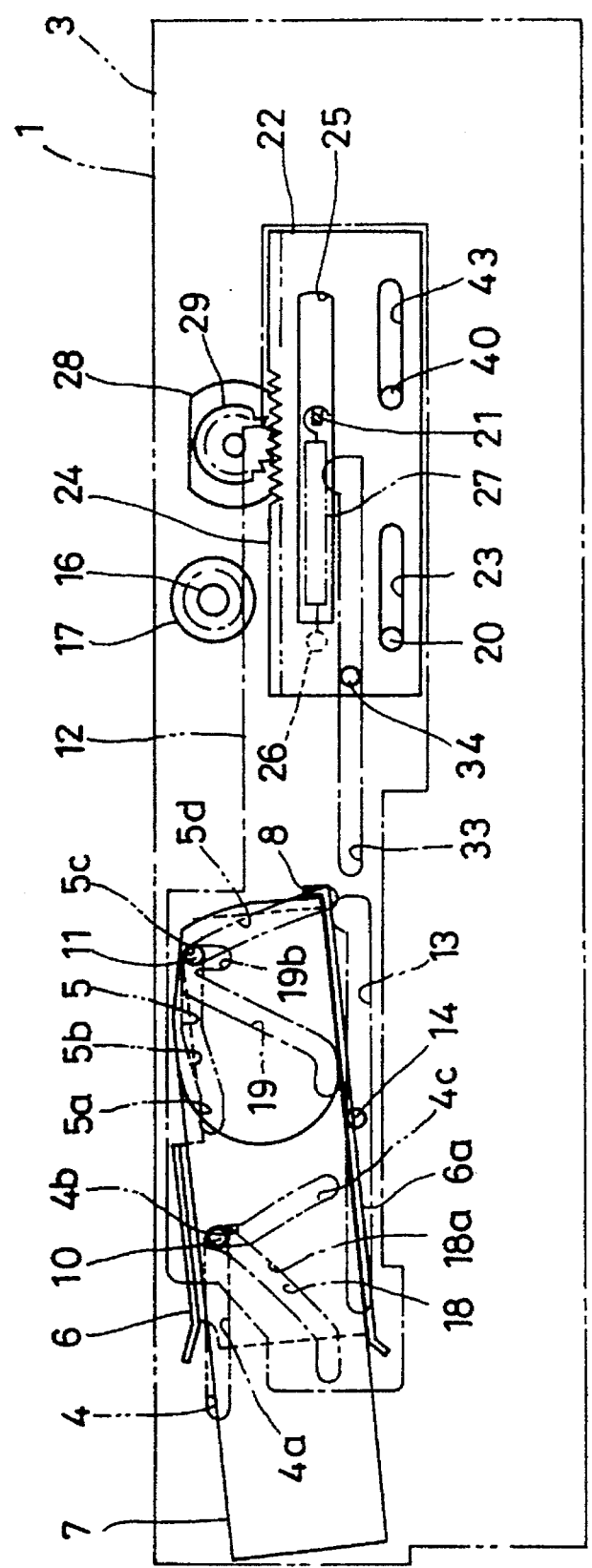
FIG. 10 is a schematic side elevational view showing an operating state subsequent to a state of FIG. 9.
Figure 11:
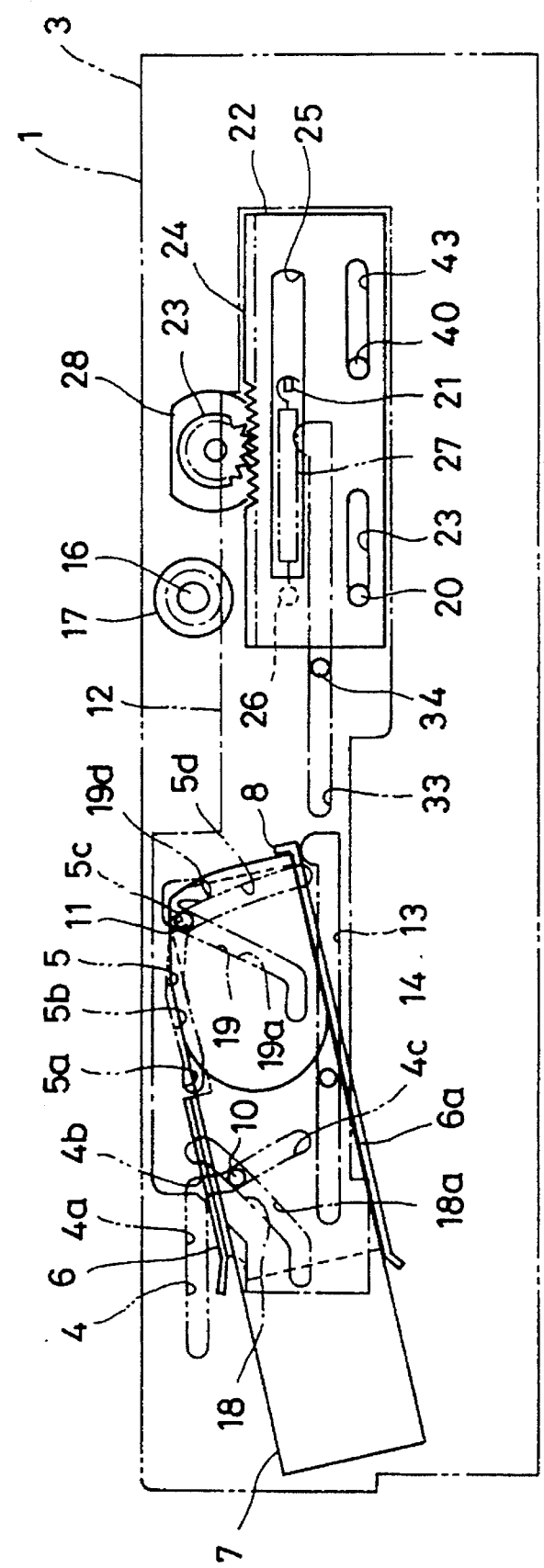
FIG. 11 is a schematic side elevational view showing an operating state subsequent to a state of FIG. 10.

When the supporting pins 11 and 11' come to the final edges of the final lead-in portions 5c and 5c', the supporting pins 10 and 10' on the front side reach the rear edges of the lead-in portions 4a and 4a', namely, the upper edges of the initial descending portions 4b and 4b', respectively. In this instance, as shown in FIG. 10, the supporting pins 11 and 11' are located to slightly rear positions than the projecting portions 19e and 19e' existing at the lower edge of the horizontal portion 19c of the cam grooves 19 and 19'. In the state of FIG. 10, the movements in the lower direction of the supporting pins 10 and 10' are not obstructed. On the other hand, since the supporting pins 11 and 11' are located at the upper positions of the projecting portions 19e and 19e' after that, the movements in the lower direction of the supporting pins 11 and 11' are obstructed. In the state of FIG. 10, therefore, although the supporting pins 11 and 11' are not moved, the supporting pins 10 and 10' descend in the initial descending portions 4b and 4b', respectively. Thus, the cassette holder 6 is set to a position such that the rear side is further lower than the front side. When the supporting pins 10 and 10' are moved to the lower edges of the initial descending portions 4b and 4b', the supporting pins 11 and 11' ride across the projecting portions 19e and 19e' and are moved to the inclined portions 19a and 19a'. After that, the supporting pins 10 and 10' are moved through cross points between the inclined portions 18a and 18a' and the inclined portions 4c and 4c'. The supporting pins 11 and 11' are moved through the cross points between the inclined portions 19a and 19a' and the inclined portions 5d and 5d'. FIG. 11 shows such a state. The inclined portions 4c and 4c' are formed so as to have arc-like shapes such that a position near the lower edge on the front edge side of the tape cassette 7 loaded in the cassette holder 6 is set to a virtual center. Therefore, the cassette holder 6 is rotated clockwise around the virtual center as a rotational center. Angles of inclination of the inclined portions 18 and 18' and inclined portions 19 and 19' of the cam plates 12 and 12' are set to angles which are determined in correspondence to the inclined portions 4c and 4c' of the side wall 3 of the casing 1.

Figure 12:
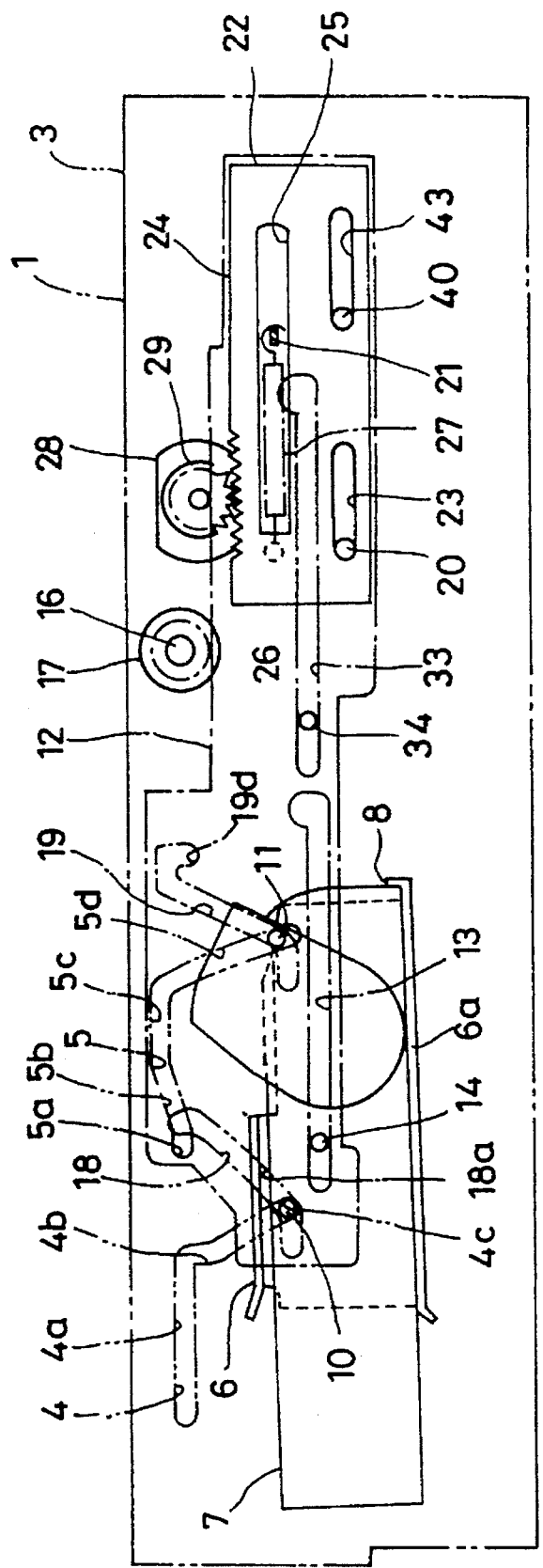
FIG. 12 is a schematic side elevational view showing an operating state subsequent to a state of FIG. 11.
Figure 13:
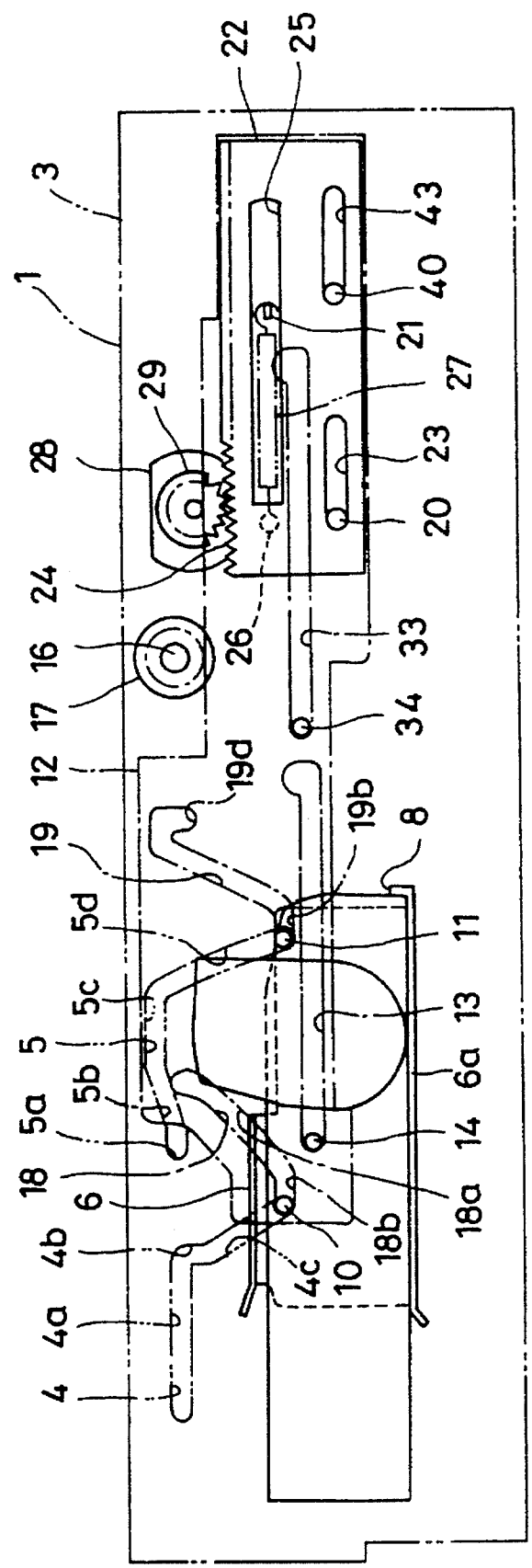
FIG. 13 is a schematic side elevational view showing a state in which a cassette loading is completed.

As shown in FIG. 12, at a time point when the supporting pins 10 and 10' reach the cross points between the lower edges of the inclined portions 4c and 4c' and the lower edges of the inclined portions 18 and 18' and the supporting pins 11 and 11' reach the cross points between the lower edges of the inclined portions 5d and 5d' and the lower edges of the inclined portions 19 and 19', the cassette holder 6 is set to a completely horizontal state. After that, when the cam plates 12 and 12' are moved further in the rear direction, the supporting pins 10 and 10' are come into engagement with the loading portions 18b and 18b' and the supporting pins 11 and 11' are come into engagement with the loading portions 19b and 19b'. Thus, the cassette holder 6 is locked so as not to move in the upper direction. FIG. 13 shows such a state.

The completion of the loading of the cassette can be also detected by the photointerrupter attached to the side wall 3 and the shielding member provided for the cam plate.

The tape cassette 7 is loaded as mentioned above. When the tape cassette 7 is ejected, the motor 28 is rotated in the direction opposite to the direction upon loading and the cam plates 12 and 12' are moved in the front direction. The operation opposite to that upon loading is executed, thereby ejecting the tape cassette 7.

Figure 14:
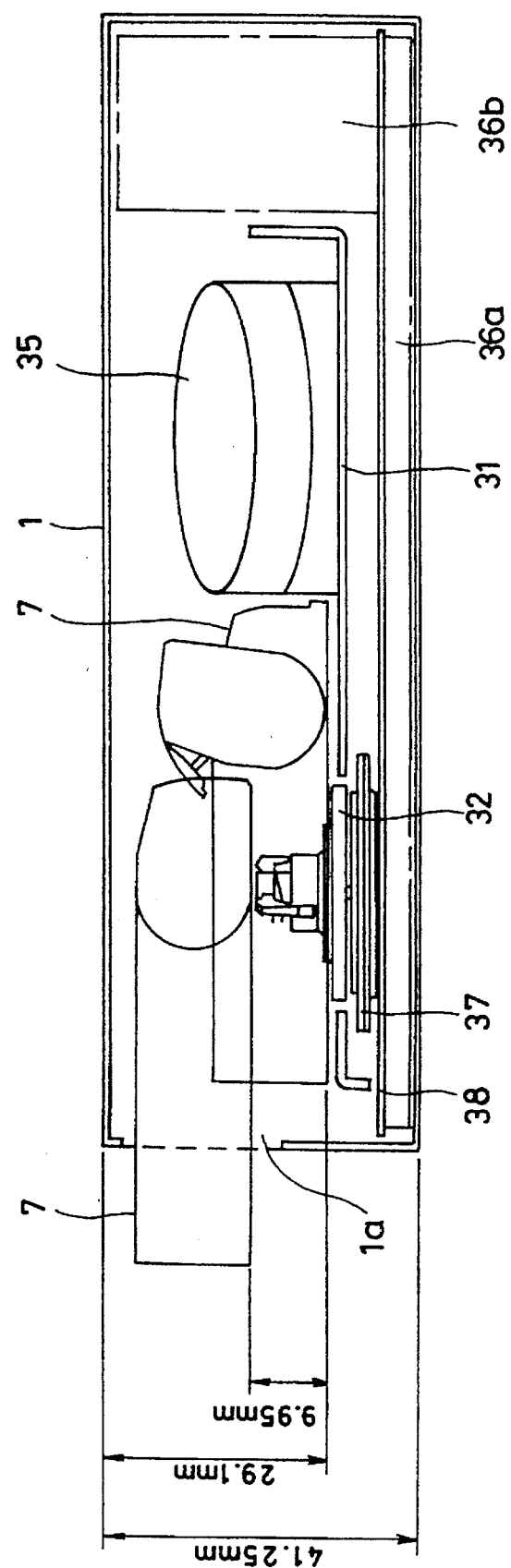
FIG. 14 is a schematic side elevational view of a construction in a casing.

As shown in FIG. 14, the casing 1 is attached to a mechanical chassis 31 in which another mechanism or drive unit is enclosed. A rotary axis is projected upward through an opening of the mechanical chassis 31 in a manner such that when the cassette 7 is inserted from a cassette enclosing port 1a of the front surface of the casing 1 and is loaded at the final position, the cassette 7 comes into engagement with a reel hub therein. The cassette 7 is finally positioned into the casing 1. A reel base plate 32 having a rotary axis is directly coupled with a rotary axis of a thin reel motor 37 mounted on a main board 38. Such a reel drive section is provided in association with the tape supply side and tape take-up side.

A tape guide drum 35 is provided for the mechanical chassis 31. A magnetic tape is pulled out from the cassette 7 by a tape loading mechanism (not shown) provided on the mechanical chassis 31. The tape is wrapped around the peripheral surface of the drum 35. Electronic component elements are mounted onto the main board 38 in mounting spaces 36a and 36b, respectively. As electronic component elements, there are discrete circuit parts, a microcomputer, and the like and they are provided to control the cassette loading mechanism, tape loading mechanism, reel motor 37, and rotation of the drum 35.

An example of numerical values of the heights are shown in FIG. 14. First, as a reference value of the height of the casing 1, a standard value (41.25 mm) of the existing disk drive of 3.5 inches is selected. In the embodiment, an interval between the upper surface of the casing 1 and the bottom surface of the cassette 7 at the final loading position is set to 29.1 mm. A value of a descending stroke between the bottom surface of the cassette 7 at the initial position which is inserted and the bottom surface of the cassette 7 at the final loading position is set to 9.95 mm. The reel motor 37 can be mounted onto the main board 38 due to such height dimensions, so that the mounting space 36a of the lower surface of the main substrate 38 can be assured.

FIG. 15 is a diagram showing both of the above cassette loading mechanism and the construction in the casing 1 in FIG. 14.

To form the guide grooves and cam grooves in the above embodiment, rails can be also attached to the plate surface instead of notching the plate.

In the embodiments, the horizontal portions 5c and 5c' are provided at the positions higher than the horizontal portions 4a and 4a'. However, the invention is not always limited to such a positional relation. That is, this is because it is sufficient to obtain a state in which the rear side of the cassette holder 6 is lower than the front side when the supporting pins 10 and 10' are located at the positions of the rear edges of the horizontal portions 4a and 4a'. That is, this is because so long as the supporting pins 11 and 11' are provided at the positions higher than the supporting pins 10 and 10', even if the height of the horizontal portions 4a and 4a' is equal to the height of the horizontal portions 5c and 5c', a state in which the rear side of the cassette holder 6 is lower than the front side can be obtained.

The present invention is not limited to the foregoing embodiments but many modifications and variations are possible within the spirit and scope of the appended claims of the invention.

What is claimed is:

1. A cassette loading apparatus for loading a cassette at a position between an inserting position and a loading position, comprising:

a casing member having first and second side walls, in which at least one of said side walls has (i) a first guide groove comprising a horizontal portion extending in a first direction which coincides with an inserting direction of said cassette, an initial descending portion which is continuously formed from one end on a rear side in said inserting direction of said horizontal portion and extends in the vertical direction, and a descending inclined portion which is continuously formed from a lower end of said initial descending portion and extends downward as said descending inclined portion slopes from said lower end of said initial descending portion toward said rear side and (ii) a second guide groove which is formed on the rear side of said first guide groove and comprises a lead-in portion extending in said first direction and a descending inclined portion which is continuously formed from one end on a rear side of said lead-in portion and slopes in a lower direction as said descending inclined portion approaches said rear side;

a cam member which is supported at one of said side walls of said casing member so as to be movable in said first direction and comprises (i) a third guide groove having a first inclined portion formed so as to slope upwardly as said first inclined portion approaches the rear side along said first direction and (ii) a fourth guide groove which is formed on a rear side of said third guide groove and has a second inclined portion formed so as slope upwardly as said second inclined portion approaches the rear side along said first direction and an engaging portion formed so as to extend almost downward from an upper edge of said second inclined portion; and a cassette holder which can hold said cassette and has (i) a first engaging member engageable with said first guide groove of said side wall through said third guide groove of said cam member and (ii) a second engaging member engageable with said second guide groove of said side wall through said fourth guide groove of said cam member, wherein when said second engaging member is located to said lead-in portion at said second guide groove, said cassette holder is set to a state in which the rear side in said first direction is inclined so as to be directed upwardly from the front side, and when said first engaging member of said cassette holder is located at a position defined by an edge portion on the rear side of said horizontal portion of said first guide groove and an upper edge portion of said third guide groove, said second engaging portion is located at a position defined by an edge portion on the rear side of said lead-in portion of said second guide groove and a coupling portion of an upper end of said second inclined portion of said fourth guide groove and an upper end of said engaging portion.

2. An apparatus according to claim 1, wherein said second guide groove formed in said side wall further includes:

an inclined portion which is formed continuously with said lead-in portion on the front side of said lead-in portion and slopes downwardly as said inclined portion approaches the front side; and an initial lead-in portion which is formed continuously with said inclined portion on the front side of said inclined portion and extends in said first direction.

3. An apparatus according to claim 1, wherein said cam member further includes:

a rack plate which is attached to said cam member so as to be slidable in said first direction and has a rack along said first direction;

pressing means for pressing said rack plate to said cam member toward said front side along said first direction; and a motor for applying a rotational force to a pinion engageable with said rack of said rack plate.

4. An apparatus according to claim 1, wherein said first and second guide grooves are formed on both of said first and second side walls, respectively.

5. An apparatus according to claim 4, wherein said cam members are respectively slidable in relation to racks of said first and second side walls and said apparatus further including an axis having a pair of gears engageable with said pair of cam members, respectively.

6. An apparatus according to claim 1, wherein a width of cassette which is loaded to said cassette holder is set to about 95 mm and a width between said pair of side walls of said casing member is set to about 101.6 mm.

7. An apparatus to claim 6, wherein a height of said casing member is set to no greater than approximately 41.25 mm.

* * * * *